Aug. 23, 1960 M. KOCSUTA 2,950,132
THREADLESS PIPE COUPLING HAVING A SPLIT RING LOCKING MEANS
Filed Nov. 14, 1957 2 Sheets-Sheet 1

INVENTOR.
MICHAEL KOCSUTA
BY Walter J. Monacelli
ATTORNEY

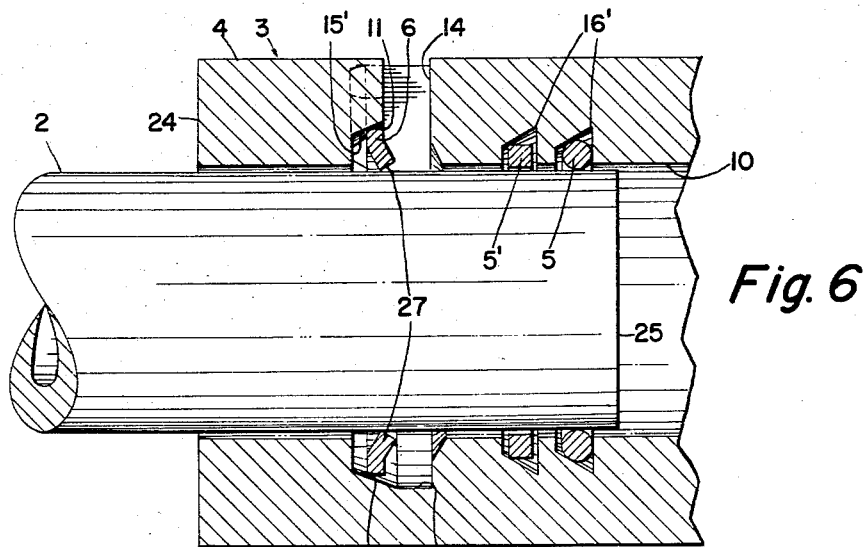
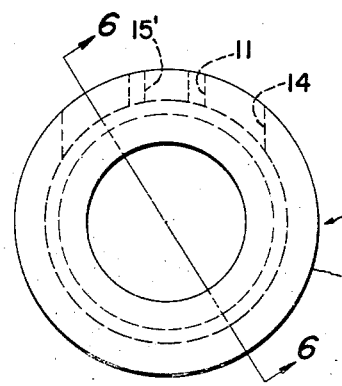
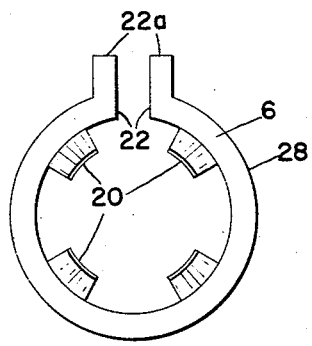
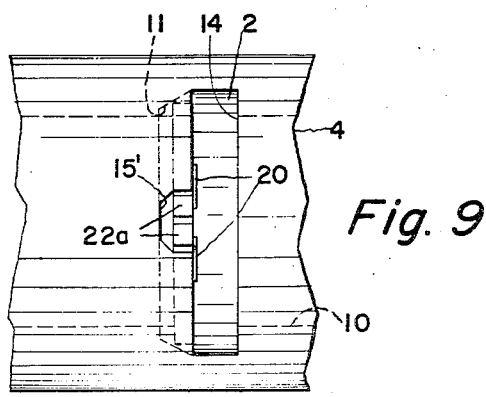
INVENTOR.
MICHAEL KOCSUTA

United States Patent Office 2,950,132
Patented Aug. 23, 1960

2,950,132

THREADLESS PIPE COUPLING HAVING A SPLIT RING LOCKING MEANS

Michael Kocsuta, 327 E. 285th St., Willoughby, Ohio

Filed Nov. 14, 1957, Ser. No. 696,390

8 Claims. (Cl. 285—307)

This invention relates generally to pipe fittings and more specifically to pipe connections in which neither the pipe nor the connector has threads thereon.

The primary object of this invention is to provide a pipe connection which is held secure without the use of threads on either the pipe itself or the fitting adjacent the pipe.

Another object is to provide a fitting into which a bare or threadless pipe may be quickly inserted to form a positively locked, fluid sealed connection.

A further object is to provide a unique yet economical locking ring for use with the pipe connection of this invention.

These and other objects will be seen from an examination of this specification with reference to the accompanying drawings, in which:

Fig. 6 is a sectional elevational view of another embodiment of the pipe connection of this invention taken along line 6—6 of Fig. 7;

Fig. 7 is a plan view of the fitting shown installed in Fig. 6;

Fig. 8 is a plan view of the locking ring shown installed in Fig. 6; and,

Fig. 9 is a partial plan view looking into openings 14' and 15' of a fitting such as in Fig. 6.

Figure 1:
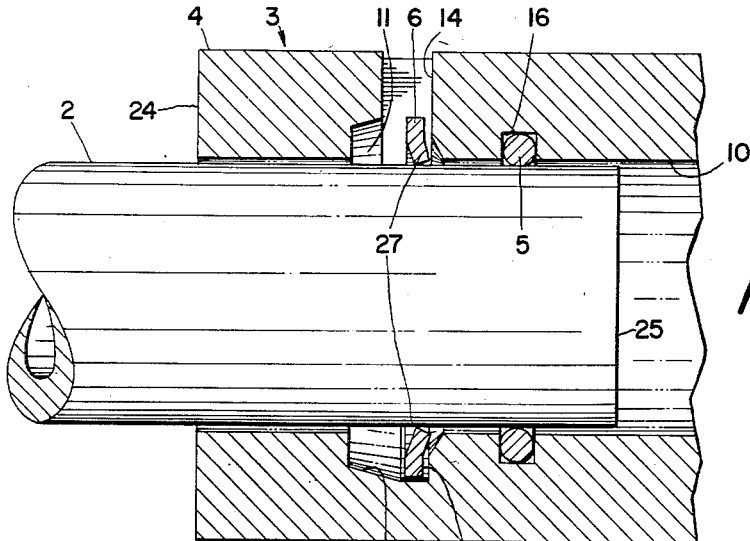
Fig. 1 represents a sectional elevational view of the pipe connection of this invention taken along line 1—1 of Fig. 2.
Figure 2:
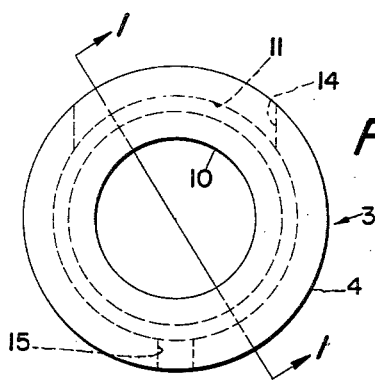
Fig. 2 is a plan view of the fitting employed in Fig. 1.

Referring now more particularly to the reference characters on the drawings, the complete pipe connection may be seen basically to include, an unmachined pipe or tube 2, a fitting 3 including a body 4, and O ring 5 and locking ring 6.

The body 4 is machined or cast to include a central bore 10, an internal recess 11 which is formed of an internal circumference 12 having a partially tapered portion 13 and an insertion slot 14 and a locking slot or hole 15 which both intersect the circumference 12. An O ring groove 16 intersects bore 10 at a spaced location from recess 11.

The structure of locking ring 6 is mainly circular in plan with inwardly extending radial prongs 20, and an outwardly extending lip 21. Ring 6 is split at a circumferential section opposite lip 21 thus forming two free ends 22. Free ends 22 include small holes 23 for reception of a tool (not shown) for expanding or contracting the ring 6. Ring 6 advantageously has a resiliency tending to bring ends 22 together. Prongs 20 have a slight resiliency and are formed in such a manner as to bend in one direction out of the circumferential plane of locking ring 6. The width of 20 can be varied in accordance with the frictional area desired for exertion on the pipe.

When assembling fitting 3 preparatory to installation of a pipe, O ring 5 is inserted in groove 16, and free ends 22 are compressed and locking ring 6 is inserted into recess 12 through slot 14. For proper installation O ring 5 will be spaced from recess 12 in the direction of the pressure side of the fitting, and prongs 20 will also point in that direction. Ring 5 is advantageously made of rubber, plastic, leather, or other composition resistant chemically to the fluid under compression. Upon insertion of a bare pipe 2 from side 24 of fitting 3 through fitting bore 10, resilient prongs 20 will give slightly to permit the pipe to pass through in one direction, until the end 25 of pipe 2 is well past O ring 5. However, when internal fluid pressure from side 26 of the connection, or when an external force is applied to pipe 2 to pull it in a direction away from side 24, the prongs 20 will dig into pipe 2 slightly as indicated at 27, but the prongs will not bend in this direction and hence will form a positive lock against any unintentional removal of pipe 2 from fitting 3. As the pressure or pull increases the outer circumference 28 of ring 6 engages and tends to move down taper 13; this action further compresses ring 6 to make its binding engagement with pipe 2 even more effective.

Intentional removal of pipe 2 may be readily accomplished by expanding ring 6 by the use of a special tool in holes 22, or manually by a screw driver or other hand tool, withdrawing the pipe from fitting 3. Removal of ring 6 from fitting body 4 after the pipe has been removed is equally simple by compressing the ring with the same special tool and lifting ring 6 out through slot 14. Ring 6 may also be removed by inserting the tool through bore 10 and compressing and removing out through this bore if the body and ring are of the proper dimensions.

Figure 5:
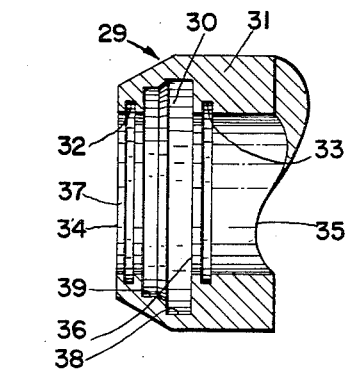
Fig. 5 is a sectional view of a modified embodiment of the invention.
Figure 4:
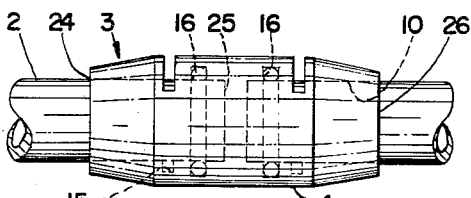
Fig. 4 is an elevational view in outline of a pipe coupling employing this invention.

The embodiment of Fig. 5 shows a fitting 29 which includes a stepped recess 30 which is completely enclosed within fitting body 31. This construction will permit placement of fluid packing in sealing grooves 32 or 33 which may be either toward or away from the pressure side 34 of this embodiment. The existence of an insertion slot 14 such as shown in Fig. 1 is not necessary here since a locking ring 6 of the proper dimensions may be compressed and inserted from side 35 into the area having the larger circumference 36. After a pipe 2 has been inserted into opening 37 and through ring 6, and lip 21 is aligned with an internal slot 38, the pipe may be moved in a direction away from side 35, and ring 6 will be centered into the area having the smaller circumference 39. Removal of pipe 2 from fitting 29 is not contemplated if the installation is considered permanent, as in the case with welded fittings, although the fitting may be removed from the pipe by cutting. However, if it is desired to construct this fitting in such a manner as to make it removable, this may be accomplished by the use of a slot similar to 14 of Fig. 1, as a tool slot in fitting 29 through which a special tool may be inserted to expand ring 6 and then remove pipe 2 as previously described. In this latter use, sealing groove 33 would not be employed.

Figure 3:
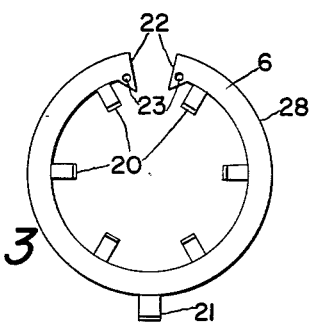
Fig. 3 is a plan view of the locking ring shown installed in Fig. 1.

Other embodiments of the invention are illustrated by Figs. 6–9 inclusive. Fig. 8 shows a locking ring which dispenses with the extending lip 21 of Fig. 3 and employs in its place extending lips 22a on free ends 22 which by restricted movement in opening 15' of Fig. 6 prevent annular movement of the locking ring. These extended lips 22a on free ends 22 are advantageous in that pressure can be more easily applied by a screw driver or other tool when it is desired to push the ring in a position to disengage the pipe from the fitting.

Fig. 6 illustrates an embodiment of the invention employing the locking ring of Fig. 8. While the ring of Fig. 8 shows no extended lip 21, the fitting can have the opening 15, if desired, so that extended lips can be employed at either or both 21 and free ends 22. Fig. 6 also illustrates that two (or even more) grooves 16 can be employed to receive sealing rings 5 and 5' on the fluid side of the ring 6. One wall of groove 16 is tapered as shown so that movement of the rings 5 and 5' by the fluid pressure exerted thereon will improve the seal by wedge effect. Ring 5' illustrates that rings of different cross-sectional shapes, rectangular in this case, as well as circular, triangular, etc., can be used.

Fig. 9 is a partial view looking down onto the assembled fitting of Fig. 6 and into openings 14 and 15'. While the cross-section of 15' can be of various shapes, the partially tapered shape shown in this view has the advantage that any movement of the locking ring in a direction parallel to and toward the narrower end of 15', will force the free ends 22 closer together and thereby tighten the grip of the locking ring onto the pipe.

From the foregoing description, it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

The invention claimed is:

1. A pipe connection for bare pipe comprising: a fitting body having a central bore, a pressure side on said body, an enlarged recess in said body adjacent said bore, a tapered portion in the circumference of said recess tapering inwardly in a direction away from said pressure side, a split locking ring in said recess, inwardly projecting prongs on said ring, said prongs being bent toward said pressure side, said prongs adapted to engage said bare pipe with sufficient pressure to prevent frictionally its accidental removal, a clearance space in the side wall of said recess on the pressure side sufficient to clear said prongs when said split ring engages said side wall, the circumference of said locking ring being adapted to engage said tapered portion whereby said ring will be compressed upon movement of said pipe in a direction away from said pressure side, and a slot connecting said recess to the exterior of said body for insertion of said split ring.

2. A pipe connection for bare pipe comprising: a fitting body having a central bore for reception of said pipe, an enlarged recess in said body adjacent said bore, a slot connecting said recess to the exterior of said body, a split locking ring having inwardly projecting prongs, means for compressing said split ring and inserting said ring in said recess, said prongs being bent toward the pressure side of said connection and being adapted to engage said bare pipe with sufficient pressure to prevent frictionally its accidental removal, wherein said slot has side walls tapering inwardly in the direction corresponding to that in which the said ring tends to be moved by the pressure exerted by said pipe, and lips at the free ends of said split ring extending into said slot in such manner that said movement of said ring serves to compress said ring by virtue of contact with said tapered walls.

3. A pipe connection of claim 1 wherein said fitting body has a groove spaced from said recess on the pressure side thereof, sealing means in said groove, and said sealing means being adapted to form a fluid pressure seal between said pipe and body.

4. A pipe connection of claim 2 in which said sealing means comprises an O ring.

5. A pipe connection of claim 3 wherein said locking ring includes at least one outwardly projecting lip, and wherein said lip engages said body to prevent rotation of said ring in said recess.

6. A pipe connection of claim 2 wherein said fitting body has a groove spaced from said recess on the pressure side thereof, sealing means in said groove, and said sealing means being adapted to form a fluid pressure seal between said pipe and body.

7. A pipe connection of claim 6 in which said sealing means comprises an O ring.

8. A pipe connection for bare pipe comprising: a fitting body having a central bore, a pressure side on said body, an enlarged recess in said body adjacent said bore, a tapered portion in the circumference of said recess tapering inwardly in a direction away from said pressure side, a split locking ring in said recess, inwardly projecting prongs on said ring, said prongs being bent toward said pressure side, said prongs adapted to engage said bare pipe with sufficient pressure to prevent frictionally its accidental removal, a clearance space in the side wall of said recess on the pressure side sufficient to clear said prongs when said split ring engages said side wall, the circumference of said locking ring being adapted to engage said tapered portion whereby said ring will be compressed upon movement of said pipe in a direction away from said pressure side, a slot connecting said recess to the exterior of said body for insertion of said split ring, said slot having a section therein with side walls tapering inwardly in a direction corresponding to that in which said ring tends to be moved by the pressure exerted by said pipe, and lips at free ends of said split ring extending into said section of said slot in such a manner that said movement of said ring serves to compress said ring by virtue of contact with said tapered walls.

References Cited in the file of this patent

UNITED STATES PATENTS

| 472,342 | Draudt | Apr. 5, 1892 |
| 1,698,087 | Field | Jan. 8, 1929 |
| 1,822,056 | Noble | Sept. 8, 1931 |
| 2,324,741 | Svabek | July 20, 1943 |
| 2,341,164 | Shimek | Feb. 8, 1944 |
| 2,346,051 | Seamark | Apr. 4, 1944 |
| 2,360,732 | Smith | Oct. 17, 1944 |
| 2,459,251 | Stillwagon | Jan. 18, 1949 |
| 2,491,004 | Graham | Dec. 13, 1949 |
| 2,595,787 | Heimann | May 6, 1952 |
| 2,669,700 | Rauch | Feb. 16, 1954 |
| 2,739,615 | Wurzel | Mar. 27, 1956 |
| 2,805,089 | Hansen | Sept. 3, 1957 |

FOREIGN PATENTS

| 605,006 | Great Britain | July 14, 1948 |

UNITED STATES PATENT OFFICE

CERTIFICATE OF CORRECTION

Patent No. 2,950,132                              August 23, 1960

Michael Kocsuta

It is hereby certified that error appears in the printed specification of the above numbered patent requiring correction and that the said Letters Patent should read as corrected below.

Column 4, line 8, for the claim reference numeral "2" read -- 3 --; line 10, for the claim reference numeral "3" read -- 1 --.

Signed and sealed this 31st day of January 1961.

(SEAL)
Attest:

KARL H. AXLINE

Attesting Officer

ROBERT C. WATSON
Commissioner of Patents